(12) United States Patent
Van Der Lee et al.

(10) Patent No.: US 9,735,835 B2
(45) Date of Patent: Aug. 15, 2017

(54) POWER TRANSFER ARCHITECTURE WITH CHARGING HISTORY

(71) Applicant: Avago Technologies General IP (Singapore) Pte. Ltd., Singapore (SG)

(72) Inventors: Reinier Van Der Lee, Lake Forest, CA (US); John Walley, Ladera Ranch, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 862 days.

(21) Appl. No.: 13/730,456

(22) Filed: Dec. 28, 2012

(65) Prior Publication Data

US 2014/0184148 A1 Jul. 3, 2014

(51) Int. Cl.
*H02J 7/00* (2006.01)
*H04B 5/00* (2006.01)
*H02J 7/02* (2016.01)
*H02J 5/00* (2016.01)
*H04W 12/06* (2009.01)

(52) U.S. Cl.
CPC ............ *H04B 5/0037* (2013.01); *H02J 5/005* (2013.01); *H02J 7/025* (2013.01); *H04B 5/0031* (2013.01); *H02J 2007/0096* (2013.01); *H04B 5/0012* (2013.01); *H04B 5/0075* (2013.01); *H04W 12/06* (2013.01)

(58) Field of Classification Search
CPC .... H02J 7/025; H02J 2007/0096; H02J 5/005; H01F 38/14; H04W 72/04; H04W 12/06; H04W 4/008; H04W 84/12; H04B 5/0037; H04B 5/0031; H04B 5/0012
USPC .................................. 320/108, 142, 166
See application file for complete search history.

(56) References Cited

U.S. PATENT DOCUMENTS

| | | | |
|---|---|---|---|
| 7,068,163 B2* | 6/2006 | Sari et al. | 340/539.13 |
| 7,375,493 B2* | 5/2008 | Calhoon | G06F 1/26 320/106 |
| 7,893,564 B2* | 2/2011 | Bennett | H02J 17/00 307/104 |
| 8,159,364 B2* | 4/2012 | Zeine | H02J 7/025 340/3.1 |
| 2010/0179822 A1* | 7/2010 | Reppas | G06Q 10/08 705/2 |
| 2011/0050164 A1* | 3/2011 | Partovi | H01F 5/003 320/108 |
| 2013/0063082 A1* | 3/2013 | Lee et al. | 320/108 |
| 2013/0154557 A1* | 6/2013 | Lee et al. | 320/108 |
| 2013/0257364 A1* | 10/2013 | Redding | 320/108 |
| 2014/0018059 A1* | 1/2014 | Noonan | H04W 8/005 455/419 |

(Continued)

*Primary Examiner* — Helen Rossoshek
(74) *Attorney, Agent, or Firm* — Sterne, Kessler, Goldstein & Fox P.L.L.C.

(57) ABSTRACT

An apparatus and method are disclosed to increase the efficiency of communications between wireless power transfer (WPT) devices. During an initial power transfer and/or communication between WPT devices, characteristics regarding the operation and capabilities of the devices are shared and stored on one or both of the WPT devices. On subsequent power transfers and/or communications, a WPT device can quickly match the capabilities and preferences for the same WPT device. Various systems are presented to generate, access, and implement the stored information to quickly tailor and improve a communication session for a specific WPT device.

21 Claims, 6 Drawing Sheets

(56) References Cited

U.S. PATENT DOCUMENTS

| | | | |
|---|---|---|---|
| 2014/0057559 A1* | 2/2014 | Smith | 455/41.1 |
| 2014/0091633 A1* | 4/2014 | Walley et al. | 307/104 |
| 2014/0091755 A1* | 4/2014 | Walley et al. | 320/108 |
| 2014/0094116 A1* | 4/2014 | Walley et al. | 455/41.1 |
| 2014/0141715 A1* | 5/2014 | Smith | 455/41.1 |
| 2014/0176054 A1* | 6/2014 | Porat et al. | 320/108 |
| 2014/0184150 A1* | 7/2014 | Walley | 320/108 |
| 2014/0184152 A1* | 7/2014 | Van Der Lee et al. | 320/108 |
| 2014/0292095 A1* | 10/2014 | Tsukamoto et al. | 307/104 |
| 2014/0312833 A1* | 10/2014 | Won et al. | 320/108 |
| 2014/0312852 A1* | 10/2014 | Won et al. | 320/137 |
| 2014/0346885 A1* | 11/2014 | Walley et al. | 307/104 |
| 2014/0347007 A1* | 11/2014 | Kee et al. | 320/108 |
| 2015/0015180 A1* | 1/2015 | Miller | H02J 7/025 320/103 |
| 2016/0099756 A1* | 4/2016 | Leabman | H04B 5/0037 307/104 |
| 2016/0099757 A1* | 4/2016 | Leabman | H04B 5/0037 307/104 |

\* cited by examiner

POWER TRANSFER ARCHITECTURE WITH CHARGING HISTORY

BACKGROUND

Field of Disclosure

The disclosure relates to wireless power transfer (WPT), and more specifically to improving WPT between WPT devices.

Related Art

Wireless power transfer (WPT) is a technology integrated into a variety of devices which require frequent battery recharging. For example, mobile devices such as smartphones, laptops, tablets, and peripheral devices such as wireless headsets, all have batteries that require recharging, sometimes on a daily basis. A device equipped with WPT can be charged without requiring the device to be plugged directly into a power source. The WPT device is placed in close proximity to a WPT charger, which derives its power for operation from a standard power source such as an AC wall outlet. As long as the WPT device remains in proximity to the WPT charger, the WPT device will continuously charge. In this way, it is possible for an end user to use a WPT, such as a laptop, which remains relatively stationary during ordinary operation, while eliminating all power cords, adapters, and outlets that would otherwise be necessary to avoid draining the laptop battery. Therefore, WPT has been heralded not only as a convenience, but also as a "green" technology, in that the utility of several power cords can be consolidated into a single WPT charger serving multiple WPT devices.

The WPT charger and the WPT device employ inductive or capacitive coupling between one another. The WPT charger generates a magnetic field by driving current through a coil, or an electric field by applying a charge to a metallic plate. The WPT device utilizes power harvesting circuitry coupled to a complementary coil or metallic plate to deliver a charging current and/or a charging voltage to a battery.

BRIEF DESCRIPTION OF THE DRAWINGS/FIGURES

Figure 1:
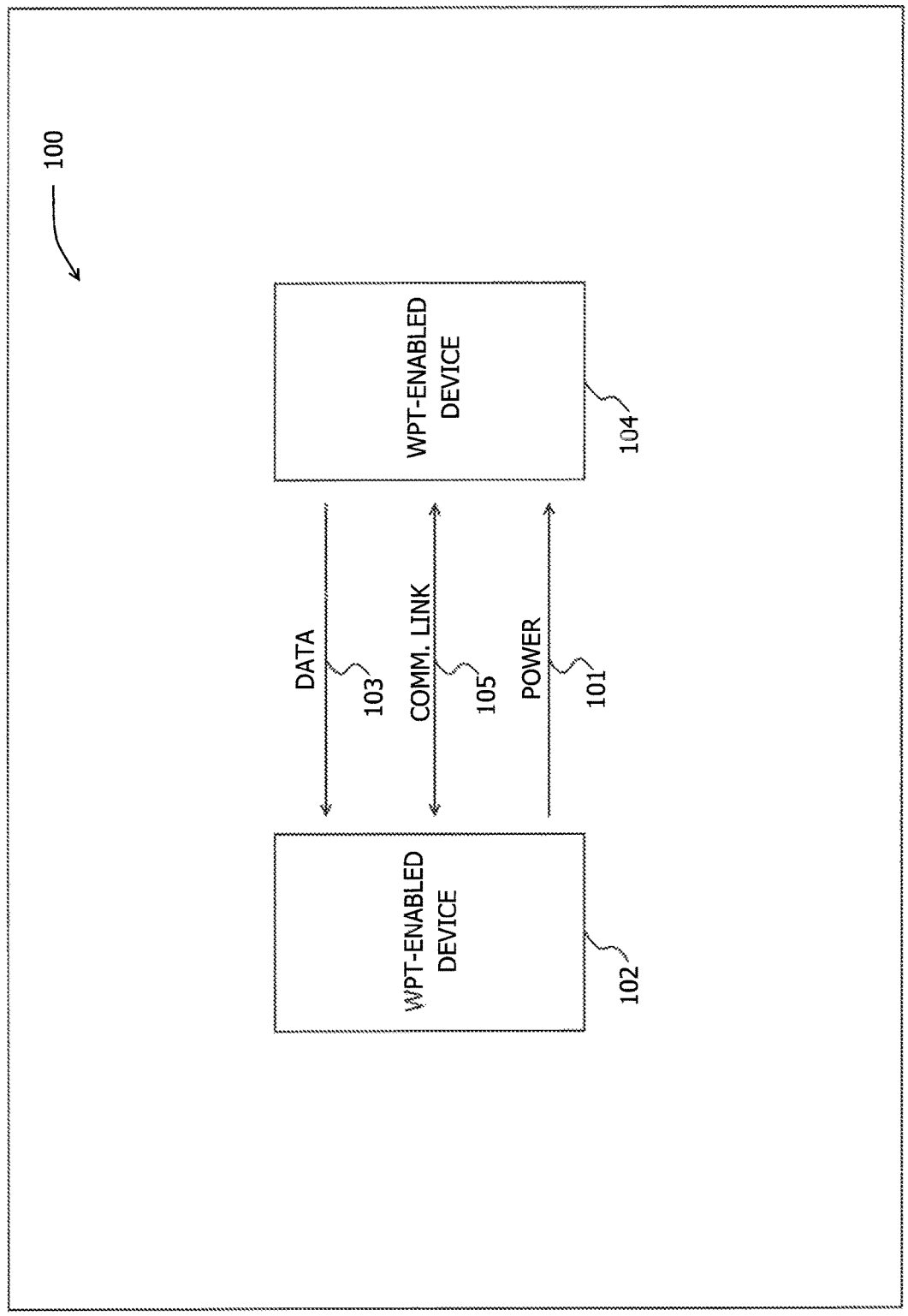
FIG. 1 illustrates a block diagram of a pair of coupled WPT-enabled devices according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications can be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of WPT, those skilled in the relevant art(s) will recognize that the present disclosure can be applicable to other communication protocols that harvest power from an electromagnetic signal. For example, the present disclosure can be applicable to Radio-Frequency identification (RFID), or near-field communications (NFC).

By way of example, the components as illustrated in the Figures referenced throughout the disclosure can be configured as a system on a chip (SoC), an integrated circuit (IC), or a plurality of SoC's and/or IC's. It should be noted that any, some, or all of the functionality of the components as illustrated in the Figures referenced throughout the disclosure can be combined as part of a single device or separated amongst multiple devices.

An Exemplary Wireless Power Transfer (WPT) Environment

FIG. 1 illustrates a block diagram of a pair of coupled WPT-enabled devices according to an exemplary embodiment of the disclosure. A WPT environment 100 illustrates wireless transfer of transferred power 101 and communication of data 103 between a first WPT-enabled device 102 and a second WPT-enabled device 104 that are sufficiently proximate to each other.

The first WPT-enabled device 102 and/or the second WPT-enabled device 104 may be implemented as a stand-alone accessory, or may be incorporated within or coupled to another electrical device or host device such as a mobile telephone, a portable computing device, another computing device such as a laptop or a desktop computer, a computer peripheral such as a printer, a portable audio and/or video player, a toy, a game, and/or any other suitable electronic device that will be apparent to those skilled in the relevant art(s) without departing from the spirit and scope of the disclosure.

The first WPT-enabled device 102 generates an electromagnetic field, such as a magnetic or an electric field to provide some examples, using a first coupler to provide the transferred power 101. The first WPT-enabled device 102 receives and stores the data 103 from the second WPT-enabled device 104 which includes various operating parameters of the second WPT-enabled device 104. The first WPT-enabled device 102 can adjust, vary, and/or enable or disable a characteristic of the transferred power 101 according to the data 103.

The second WPT-enabled device 104 includes a second coupler that receives the transferred power 101, in the form of the electromagnetic field generated by the first WPT-enabled device 102. The second WPT-enabled device 104 harvests a charging current and/or a charging voltage from the transferred power 101 and delivers the charging current and/or the charging voltage to a load, such as a battery to provide an example. The second WPT-enabled device 104 can request adjustments to the characteristics of the transferred power 101 by sending the data 103 as feedback to the first WPT-enabled device 102. The second WPT-enabled device 104 can communicate with the first WPT-enabled device 102 using the communication link 105, which can be implemented separately from, or in combination with, the WPT communication of data 103. The second WPT-enabled device 104 can communicate any capabilities of the additional functionality to the first WPT-enabled device 102 using the data 103 and/or the communication link 105.

The first WPT-enabled device 102 and the second WPT-enabled device 104 can interact in any number of sessions, in which the first WPT-enabled device 102 and the second WPT-enabled device 104 are separated and then brought back together in close proximity to initiate a subsequent session. In any of these sessions, the first WPT-enabled device 102 can store the various operating parameters received from the second WPT-enabled device 104 using the data 103 and/or the communication link 105, and set characteristics for the WPT interaction. On subsequent sessions, the first WPT-enabled device 102 can identify the second WPT-enabled device 104 based on the stored operating parameters, and set characteristics of the transferred power 101 to match the previously set characteristics.

An Exemplary WPT-Enabled Transmitting Device

Figure 2:
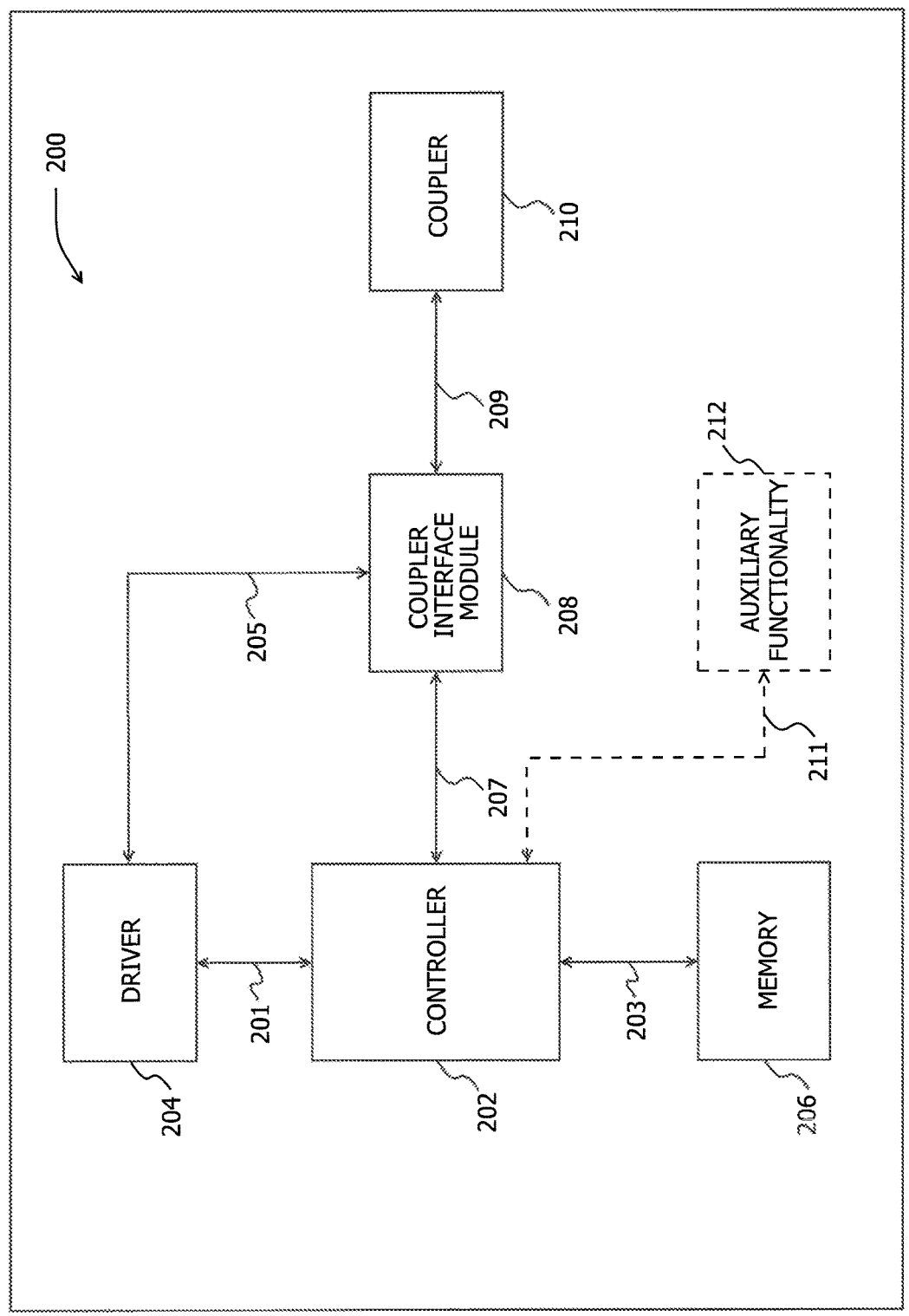
FIG. 2 illustrates a block diagram of a WPT-enabled transmitting device according to an exemplary embodiment of the disclosure.

FIG. 2 illustrates a block diagram of a WPT-enabled transmitting device according to an exemplary embodiment of the disclosure. A WPT-enabled transmitting device 200 includes a controller module 202, a driver module 204, a memory module 206, a coupler interface module 208, a coupler module 210, and an auxiliary functionality module 212. The WPT-enabled transmitting device 200 can represent an exemplary embodiment of the first WPT-enabled device 102.

The controller module 202 can be configured to monitor and/or control communications and/or operational functions of the WPT-enabled transmitting device 200. Specifically, the controller module 202 can communicate with, and control the functionality of, the driver module 204, the coupler interface module 208, and/or the auxiliary functionality module 212 using driver module bus 201, second coupler interface module bus 207, and/or auxiliary functionality bus 211, respectively. A log of the history of the communications between the controller module 202, the driver module 204, the coupler interface module 208, and/or the auxiliary functionality module 212 can also be stored in the memory module 206. In this way, an entire history of the wireless power transfer interaction between the WPT-enabled transmitting device 200 and another WPT-enabled device, such as the second WPT-enabled device 104, for example, can be stored in the memory module 206 as a configuration record, for example.

Furthermore, multiple configuration records containing histories of several wireless power transfer interactions between the WPT-enabled transmitting device 200 and another WPT-enabled device, such as the second WPT-enabled device 104, for example, can be stored in the memory module 206. The multiple configuration records can be stored as new data, appended to previous wireless power transfer configuration records, and/or written over previous wireless power transfer configuration records to generate an updated power transfer configuration record.

The controller module 202 can communicate with the driver module 204 to initiate a wireless power transfer with another WPT-enabled device. The controller module 202 can receive data from the driver module 204 which is sent by another WPT-enabled device, such as the second WPT-enabled device 104, for example. The controller module 202 can demodulate the data received from the driver module 204, store the data in the memory module 206, and access the data from the memory module 206 using the memory module bus 203.

The driver module 204 can be configured to provide an adjustable power signal to the coupler interface module 208 via a coupler interface module bus 205. The magnitude and/or frequency of the adjustable power signal provided by the driver module 204 can be controlled by the controller module 202 via driver module bus 201.

The coupler module 210 can be configured to convert the power signal provided through the coupler interface module 208 via a coupler bus 209, the coupler interface module 208, and the coupler interface module bus 205, to a magnetic or an electric field. For example, if the driver module 204 is an adjustable current driver, the coupler module 210 can include a wire loop element. In this example, the coupler module 210 would provide a magnetic field of intensity proportional to the magnitude of the current provided by the driver module 204 through the loop coil.

The coupler interface module 208 can be configured to match the impedance of the coupler module 210 to the driver module 204. The impedance matching circuitry of the coupler interface module 208 can be adjusted by the controller module 202 via a second coupler interface module bus 207. In this way, the coupler interface module 208 is capable of tuning the impedance matching circuitry to match the driver module 204 to the coupler module 210 over a range of frequencies.

In some situations, multiple coupler modules 210 can be coupled to the coupler interface module 208. The coupler interface module 208 can be configured to select one of these coupler modules 210 from among the multiple coupler modules 210 using a multiplexer or switching network, for example. The multiplexer and/or switching network of the coupler interface module 208 can be controlled by the controller module 202 via the second coupler interface module bus 207. The coupler interface module 208 can select multiple couplers from among the multiple coupler modules 210 and deliver the power signal simultaneously or in a time-division multiplexed manner, for example, to the selected couplers.

The auxiliary functionality module 212 can be configured to provide additional communications and/or functionalities of the WPT-enabled transmitting device 200. For example, the auxiliary functionality module 212 can enable near field communications (NFC) between the WPT-enabled transmitting device 200 and another WPT-enabled device, such as the second WPT-enabled device 104, for example. Additional communication functionality can also include Wi-Fi and BLUETOOTH communications, and/or encryption systems, for example. The controller module 202 can control and communicate with the auxiliary functionality module 212 via an auxiliary functionality bus 211.

The memory module 206 can be configured to store the data read by the controller module 202 and to allow access to the stored data by the controller module 202. The memory module 206 can include, for example, an SRAM, DRAM, and/or a non-volatile memory. Data received by the controller module 202 and stored in the memory module 206 can include, for example, various operating parameters such as the identification, configuration, functionality, status, and/or capabilities of another WPT-enabled device, such as the second WPT-enabled device 104, for example, and/or the transmitting WPT-enabled transmitting device 200.

The operating parameters related to the transmitting WPT-enabled transmitting device 200 can include, for example: WPT standards supported, wireless communications standards supported, a total power available for a wireless transfer, a resonance of the power signal provided by the driver module 204, the coupler interface module 208, and/or the coupler module 210, a tuning state of the coupler interface module 208 and/or the coupler module 210, a coupling factor between the WPT-enabled transmitting device 200 and a second WPT-enabled device, such as the second WPT-enabled device 104, for example, metal content, operating frequencies and/or frequency bands associated with the driver module 204, the coupler interface module 208, and/or the coupler module 210, power status, model number, device type, and/or billing information (if a public pay-to-charge terminal, for example). To provide further examples, the operating parameters can also include communication related information, such as communication infrastructure information, networking information, hosted services, network or IP addresses, user information, and/or security information such as encryption keys. The data can be organized as a configuration record and/or file and/or encrypted in the memory module 206 for efficient and secure access by the controller module 202.

After an initial WPT session which results in the operating parameters being stored in the memory module 206, the controller module 202 can access the operating parameters to customize subsequent WPT sessions to a particular WPT-enabled device. In other words, once information regarding a preferred WPT session is stored in the memory module 206, future WPT sessions can initially skip a portion of the data gathering procedure for subsequent WPT sessions since the data is already available. The controller module 202 can then tailor subsequent WPTs to a particular WPT-enabled device by first identifying the WPT-enabled device, and then correlating the stored interaction history to the identified WPT-enabled device.

An Exemplary WPT-Enabled Receiving Device

Figure 3:
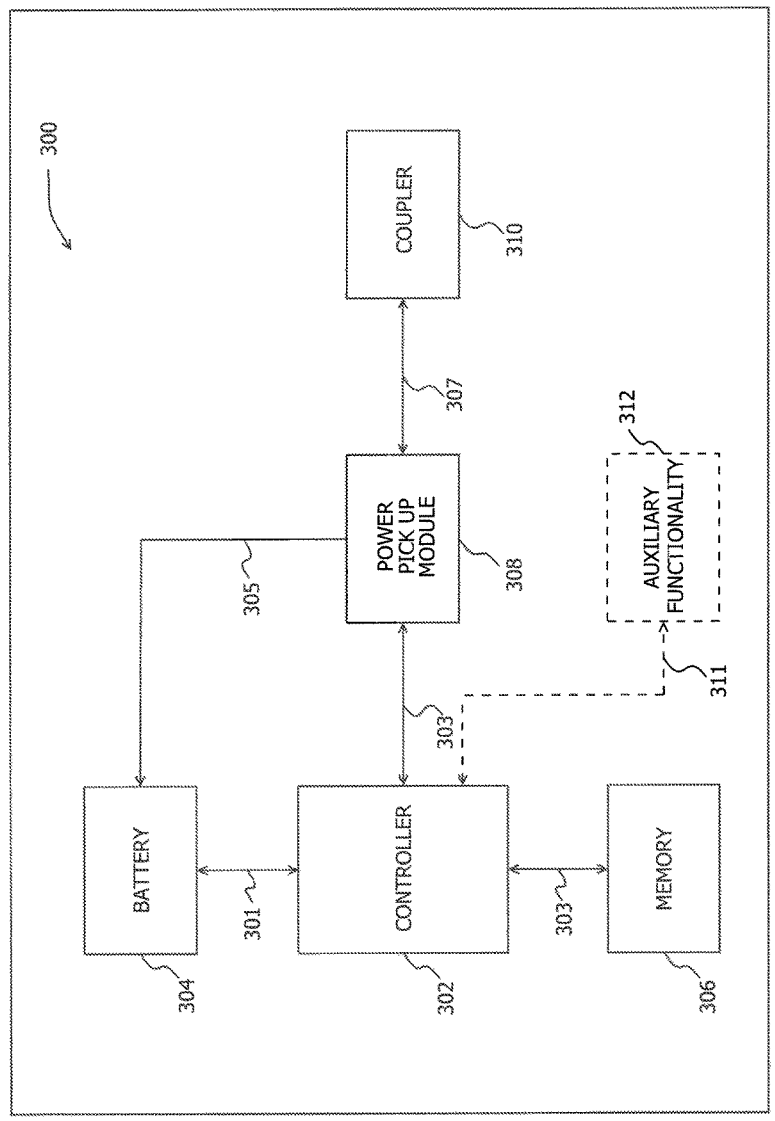
FIG. 3 illustrates a block diagram of a WPT-enabled receiving device according to an exemplary embodiment of the disclosure.

FIG. 3 illustrates a block diagram of a WPT-enabled receiving device according to an exemplary embodiment of the disclosure. A WPT-enabled receiving device 300 includes a controller module 302, a power pickup module 308, a coupler module 310, a memory module 306, an auxiliary functionality module 312, and a battery module 304. The WPT-enabled receiving device 300 can represent an exemplary embodiment of the second WPT-enabled device 104. The controller module 302, the power pickup module 308, the coupler module 310, the memory module 306, and the auxiliary functionality module 312, can operate in a substantially similar manner as the controller module 202, the coupler interface module 208, the coupler module 210, the memory module 206, and the auxiliary functionality module 212, respectively. Therefore, only differences between the coupler module 310, the power pickup module 308, the memory module 306, and the auxiliary functionality module 312, the controller module 202, the coupler interface module 208, the coupler module 210, the memory module 206, and the auxiliary functionality module 212, respectively, are to be discussed in further detail.

The controller module 302 can be configured to monitor and/or control communications and/or operational functions of the WPT-enabled receiving device 300 in a substantially similar manner as the controller module 202. Additionally, the controller module 302 can be configured to monitor the status of the battery module 304 via battery status bus 301. The controller module 302 can send data to another WPT-enabled device, such as the first WPT-enabled device 102, for example, by having the power pickup module 308 load modulate the coupler module 310 via a control bus 303. The controller module 302 can send data including, for example, operating parameters of the WPT-enabled receiving device 300 such as WPT standards supported, wireless communications standards supported, total power required, a maximum power handling, a resonance of the signal coupled at the coupler module 310, a tuning state of the power pickup module 308, and/or the coupler module 310, a coupling factor between the WPT-enabled receiving device 300 and a second WPT-enabled device, such as the first WPT-enabled device 102, for example, metal content, operating frequencies and/or frequency bands associated with the power pickup module 308, and/or the coupler module 310, a status and/or charging state of the battery module 304, power status, model number, device type, and/or billing information (when used as a part of a public pay-to-charge terminal, for example). To provide further examples, the operating parameters can also include communication related information, such as communication infrastructure information, networking information, hosted services, network or IP addresses, user information, and/or security information, such as encryption keys.

The controller module 302 can control functionality of the power pickup module 308 and/or the auxiliary functionality module 312 using the control bus 303 and/or auxiliary functionality bus 311. The history of the control, and/or commands sent by the controller module 302 to control the functionality of the power pickup module 308, and the auxiliary functionality module 312 can also be stored in the memory module 306. In this way, an entire history of the wireless power transfer interaction between the WPT-enabled receiving device 300 and another WPT-enabled device, such as the first WPT-enabled device 102, can be stored in the memory module 306.

The battery module 304 is configured to provide any, some, or all of the power required by the WPT-enabled receiving device 300. The battery module 304 can be a single battery or a group of batteries, such as a battery pack, for example. The battery module 304 can include a rechargeable battery, for example, such as a Lithium-Ion (Li-ion) or Nickel Metal Hydride (NiMH) battery. The battery module 304 can provide power to other components of another electrical device or a host device, such as a laptop or mobile phone, for example. The battery module 304 can provide power to these other components in addition to, separate from, or in combination with any, some, or all of the components of the WPT-enabled receiving device 300. The battery module 304 can recharge using a power signal, such as a charging current and/or a charging voltage, provided via a battery power bus 305 and provide a feedback signal to the controller module 302 via the battery status bus 301. The feedback signal can include, for example, present battery capacity and/or overall battery capacity, a charge status, power handling requirements, required power to complete a charge cycle, and/or safety shutdown limits such as an overheating condition.

The power pickup module 308 can be configured to rectify and to condition the power signal received from the coupler module 310 via the coupler bus 307 to charge the battery via the battery power bus 305 using a power signal. The power pickup module 308 can provide the power signal with a varying or constant voltage and/or current. The power pickup module 308 can include, for example, any number of impedance matching circuits, modulators, multiplexers, switches, bridges, and/or power regulation circuits.

The power pickup module 308 can be configured to communicate with the controller module 302 via the control bus 303. The power signal can be adjusted by the controller module 302 based on the feedback signal the controller module 302 receives from the battery module 304. For example, the power pickup module 308 can be configured to regulate the power signal through current and/or voltage regulation, for example, to provide the power signal, and communicate the amount of regulation to the controller module 302. The power pickup module 308 can therefore regulate the power signal such that the power handling requirements of the battery module 304 are not exceeded.

During an initial charging session, the WPT-enabled receiving device 300 couples a power signal of a nominal intensity via the power bus 307, and regulates the power signal to provide a power signal to the battery module 304. The battery module 304 sends a feedback signal to the controller module 302 indicating whether this power signal can be increased or decreased based on the charge requirements of the battery module 304. The controller module 302 responds by sending a control signal to the power pickup module 308 to adjust the power signal. If the power pickup module approaches the limits of power regulation, such as shunting the maximum allowable current, for example, and the power signal is still in excess of the battery requirements, then the power signal intensity can be decreased. To decrease the power signal intensity, the controller module 302 can send data requesting such a decrease to the WPT-transmitting device. The transmitting WPT-enabled device, such as the first WPT-enabled device 102, for example, can adjust the intensity of the generated magnetic or electric field in response to the request.

This process continues iteratively for the initial charge until a minimum amount of adjustments need to be made by either the WPT-enabled transmitting device or a WPT-enabled receiving device. The data and the iterative steps involved for the power transfer adjustments are stored in both the WPT-enabled transmitting device and the WPT-enabled receiving device. In addition to the power adjustments, the controller module 302 can send data including capabilities of the auxiliary functionality module 312. Therefore, upon subsequent charging sessions, once a WPT-enabled receiving device is identified, the WPT-enabled transmitting device can minimize subsequent iterations by setting the power transfer adjustment settings, enabling, and/or disabling the auxiliary functionality module 312 to match that of the initial charging session which required a minimum amount of adjustments. On subsequent charges, for example, the WPT-enabled transmitting device 200 can demodulate the data sent by the WPT-enabled receiving device 300 and begin charging the WPT-enabled receiving device 300 with a more appropriate power signal tailored to the requirements of the battery module 304.

An Exemplary Multiple WPT-Enabled Device Session

Figure 4:
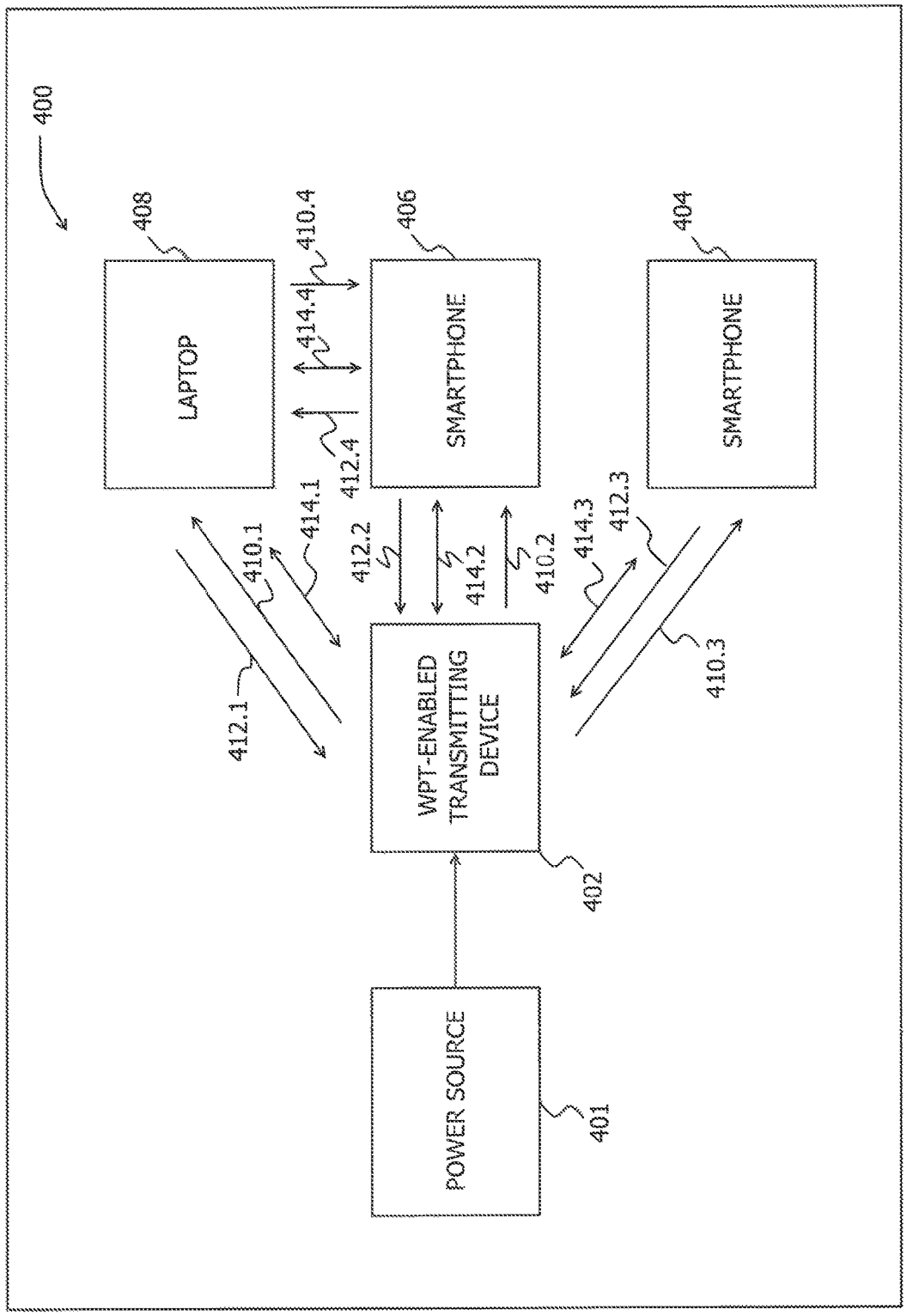
FIG. 4 illustrates a block diagram of a multiple WPT-enabled device power transfer session according to an exemplary embodiment of the disclosure.

FIG. 4 illustrates a block diagram, of a multiple WPT-enabled device power transfer session according to an exemplary embodiment of the disclosure. A multiple WPT-enabled device power transfer session 400 includes a power source 401, a WPT-enabled transmitting device 402, and multiple WPT-enabled devices including smartphones 404 and 406, and laptop 408.

The WPT-enabled transmitting device 402 can represent an exemplary embodiment of the first WPT-enabled device 102. Each of the smartphones 404 and 406, and the laptop 408 can represent an exemplary embodiment of any combination of one or more of the WPT-enabled device 102 and/or the WPT-enabled device 104. The power source 401 can include an AC or DC power source, such as wall or a car outlet, for example. The power source 501 can provide power for any of the components of the WPT-enabled transmitting device 402.

The WPT-enabled transmitting device 402 can charge the smartphones 404 and 406, and the laptop 408, simultaneously or in a time-division multiplexed manner via WPT signals 410.1 through 410.3. The power requirements to charge smartphones 404 and 406, and laptop 408 can differ between one another. For example, the laptop 408 can require 10 W of power to charge its battery, while smartphones 404 and 406 can require 2 W. To provide another example, smartphones 404 and 406 can charge more efficiently at a resonant frequency that differs from the laptop 408.

The WPT-enabled transmitting device 402 can communicate with the smartphones 404 and 406, and the laptop 408 via WPT communication links 412.1 through 412.3 or auxiliary communication links 414.1 through 414.3. At an initial charging session, the WPT-enabled transmitting device 402 can receive information regarding charge configurations such as the required power for each smartphone 404 and 406, and laptop 408 via the WPT communication links 412.1 through 412.3 or via the auxiliary communication links 414.1 through 414.3. The charge configurations can include the settings required for the WPT-enabled transmitting device 402 to generate a magnetic or an electric field of a correct intensity, frequency, and/or protocol, to deliver the proper amount of power to each device, for example.

The WPT-enabled transmitting device 402 can also receive information from smartphones 404 and 406, and laptop 408, related to auxiliary functionality. The WPT-enabled transmitting device 402, smartphones 404 and 406, and laptop 408, can store this information in their corresponding memories.

For subsequent charging sessions, the WPT-enabled transmitting device 402 can identify smartphones 404 and 406, and laptop 408 and their associated charging configurations. For example, based on the information stored in the memory of the WPT-enabled transmitting device 402, the proper power levels, protocols, and preferable resonant frequencies can be applied to charge smartphones 404 and 406, and laptop 408, without going back through the initial iterative procedure for each device.

After the smartphones 404 and 406 and the laptop 408 are charged after receiving a WPT from the WPT-enabled transmitting device 402, the smartphone 406 and the laptop 408 can then be removed, and during subsequent use, their respective batteries can discharge. If the smartphone 406 requires a battery charge and the laptop 408 has a sufficiently charged battery, the laptop 408 can initiate a WPT with the smartphone 406 using a WPT signal 410.4, and communicate with the smartphone 406 via a WPT communication link 412.4 and/or an auxiliary communication link 414.4.

For subsequent charging sessions, the laptop 408 can identify smartphone 406, and its associated charging configuration. For example, based on the information stored in the memory of the laptop 408, the proper power levels, protocols, and preferable resonant frequencies can be applied to charge the smartphone 406 without going back through the initial iterative procedure to charge the smartphone 406.

The WPT-enabled transmitting device 402, the smartphones 404 and 406, and the laptop 408 can interact with one another in any combination over multiple WPT sessions. During an initial session, for example, the WPT-enabled transmitting device 402 can store an associated charging configuration for any combination of a multiple WPT-enabled device power transfer session 400, which, can include any, some or all of the smartphones 404 and 406, and the laptop 408. If a subsequent charging session includes the WPT-enabled transmitting device 402 and the smartphones 404 and 406, but not the laptop 408, for example, the WPT-enabled transmitting device 402 can use the stored information to identify smartphones 404 and 406. Using this stored information and this identification, the WPT-enabled transmitting device 402 can adjust the associated charging configurations and settings to match the previously stored charging configurations and settings from a previous charge which included only smartphones 404 and 406.

An Exemplary Initial WPT Profile

Figure 5A:
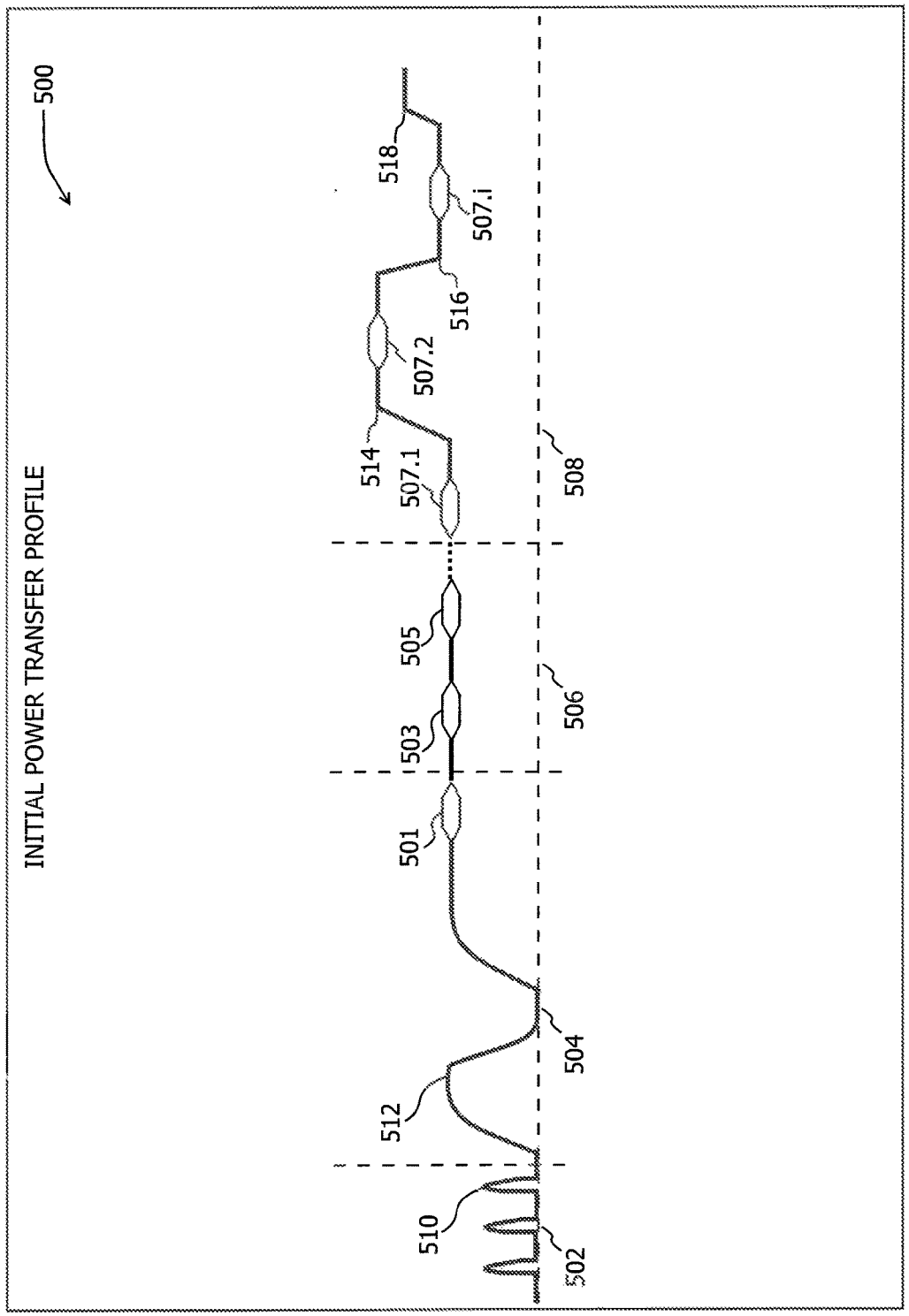
FIG. 5A illustrates an initial power transfer profile of a WPT-enabled transmitting device according to an exemplary embodiment of the disclosure.

FIG. 5A illustrates an initial power transfer profile of a WPT-enabled transmitting device according to an exemplary embodiment of the disclosure. Initial power transfer profile 500 includes a ping phase 502, a discovery phase 504, an identification and configuration phase 506, and an initial power transfer phase 508. The initial power transfer profile 500 illustrates the power output from a coupler of a WPT-enabled transmitting device, such as the WPT-enabled transmitting device 200, for example. Initial power transfer profile 500 also indicates the data sent by a WPT-enabled receiving device, such as the WPT-enabled receiving device 300, for example, and received by the WPT-enabled transmitting device.

During the ping phase 502, a WPT-enabled transmitting device periodically checks for the presence of a potential WPT-enabled receiving device, by generating low power pulses 510. If the WPT-enabled transmitting device detects a change in the low power pulses 510, by monitoring the voltage, current, power, and/or frequency of the low power pulses 510, for example, the WPT-enabled transmitting device enters the discovery phase 504.

During the discovery phase 504, the WPT-enabled transmitting device generates ping pulses 512 of increased power and duration compared to the low power pulses 510. In order to prevent coupling into foreign metallic objects, the discovery phase 504 is used to determine whether a WPT-enabled receiving device has been detected. During discovery phase 504, the WPT-enabled transmitting device increases the power to the coupler to enable load modulation of the generated magnetic or electric field by a potential WPT-enabled receiving device. If a WPT-enabled receiving device is present, the WPT-enabled receiving device can respond though load modulation by sending a control packet 501, indicating it is a valid recipient for WPT. The control packet 501 can include information such as the received signal strength at the WPT-enabled receiving device, or instructions to continue or end the WPT, for example. After the WPT-enabled transmitting device determines that a valid WPT-enabled receiving device has been detected, the WPT-enabled transmitting device enters the identification and configuration phase 506.

During the identification and configuration phase 506, the WPI-enabled receiving device responds by sending an identification packet 503 and a configuration packet 505. The identification packet 503 can contain information such as a WPT protocol version, manufacturer code, and a unique identifier, for example. The configuration packet 505 can include information such as power class, maximum power handling, auxiliary functionality, and/or any specific methods for WPT, for example. Once the WPT-enabled transmitting device receives, verifies, and stores the information included in the control packet 501, the identification packet 503, and the configuration packet 505, the WPT-enabled transmitting device can begin to wirelessly transfer power according to the initial power transfer phase 508.

During the initial power transfer phase 508, the WPT-enabled transmitting device generates a magnetic or electric field of a nominal intensity that is coupled onto the WPT-enabled receiving device. Based on a comparison of the harvested power at the WPT-enabled receiving device and the requirements of the WPT-enabled receiving device, the WPT-enabled receiving device sends control packets 507.1 through 507.*i* for the duration of a charge cycle requesting WPT adjustments such as an increase or decrease in the intensity of the generated magnetic or an electric field, WPT protocol, and/or frequency, for example. To provide further examples, control packet 507.1 results in the WPT-enabled transmitting device increasing the magnetic or electric field to a level indicated by a field intensity 514, which is excessive. Control packet 507.2 therefore results in an adjustment of the field intensity 514 to a field intensity 516, which is beneath the power handling capacity of the WPT-enabled receiving device. Finally, control packet 507.i results in an adjustment of the field intensity 516 to a field intensity 518.

The power provided to the WPT-enabled receiving device at field intensity 518 is the "target" field intensity for that particular WPT-enabled receiving device. Although only three iterations are illustrated in FIG. 5A, an implementation would ordinarily involve several iterations over the initial power transfer phase 508 to acquire the target field intensity 518. Furthermore, although only adjustments to the field intensities are illustrated in FIG. 5A, the control packets 507.1 through 507.1 would ordinarily represent changes to the WPT profile such as frequency, protocol, duty cycle, and/or a WPT standard. The WPT-enabled transmitting device and/or the WPT-enabled receiving device can store the data related to the control packets 501 and 507.1 through 507.i, and the component settings, such as a current and/or voltage driver setting, for example, which result in the corresponding field intensities. Furthermore, the WPT-enabled transmitting device and/or the WPT-enabled device can store data related to the configuration and identification associated with identification and configuration packets 503 and 505, in a local memory module.

An Exemplary Refined WPT Profile

Figure 5B:
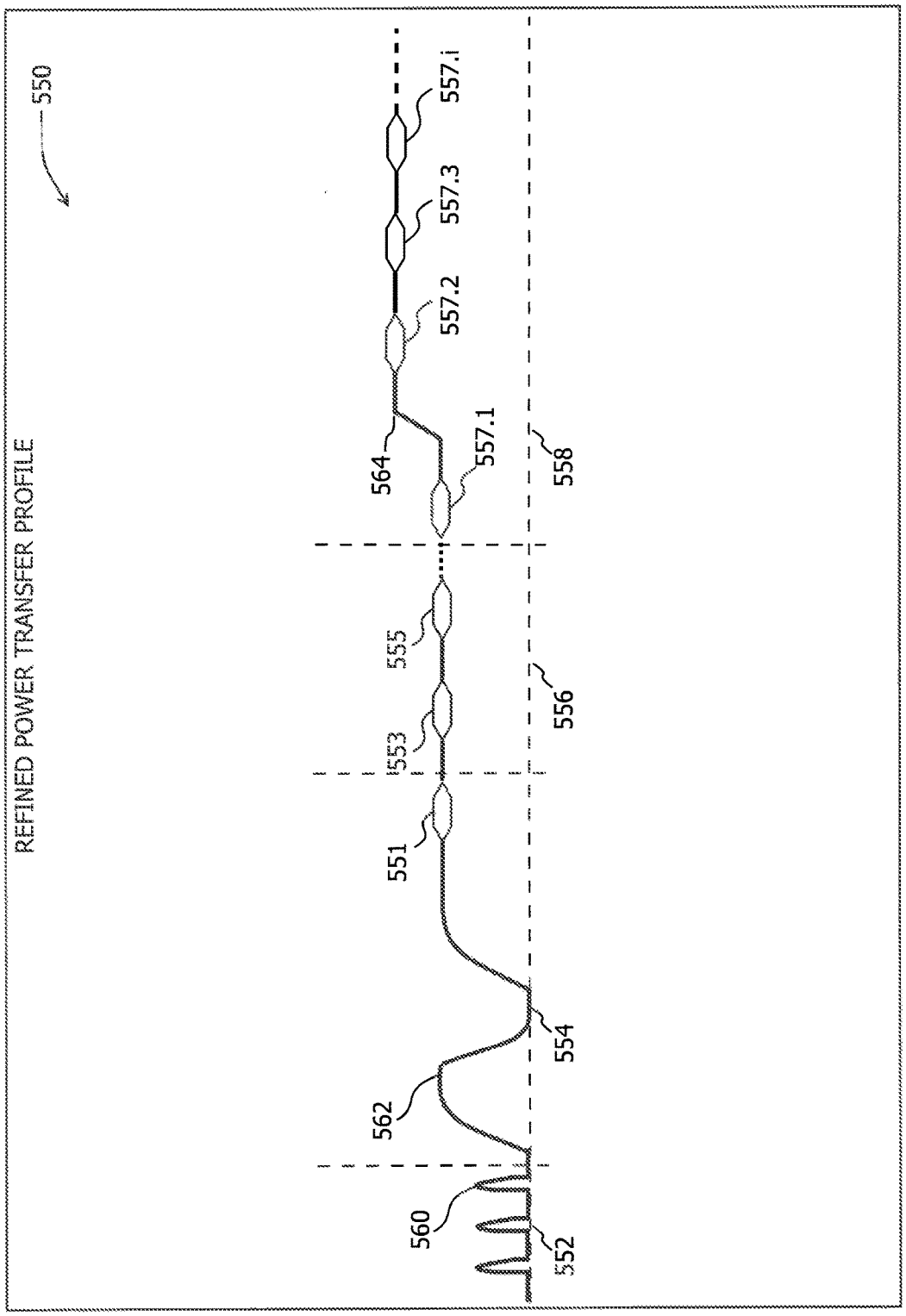
FIG. 5B illustrates a refined power transfer profile of a WPT-enabled transmitting device according to an exemplary embodiment of the disclosure.

FIG. 5B illustrates a refined power transfer profile of a WPT-enabled transmitting device, such as the WPT-enabled transmitting device 200, for example, according to an exemplary embodiment of the disclosure. Refined power transfer profile 550 includes a ping phase 552, a discovery phase 554, an identification and configuration phase 556, and a refined power transfer phase 558. The ping phase 552 and discovery phase 554 are similar to the ping phase 502 and discovery phase 504 illustrated in FIG. 5A, as these initial steps are required before initiating a power transfer phase. Similarly, the control packet 551, identification packet 553, and configuration packet 555 are similar to the control packet 501, identification packet 503, and configuration packet 505 of FIG. 5A.

However, during the configuration and identification phase 556, the WPT-enabled transmitting device can correlate the information related to the identification and configuration of a WPT-enabled device, such as the WPT-enabled receiving device 300, for example, to the same information received in the identification and configuration phase 506, since this information is stored the memory module of the WPT-enabled transmitting device. Therefore, when the WPT-enabled transmitting device proceeds to the refined power transfer phase 558, the settings, configurations, and functionality stored in memory are applied to quickly converge to a field intensity 564, which is substantially matched to the field intensity 518 in FIG. 5A. Any additional operating parameters such as WPT protocol, and/or frequency, for example, are similarly matched to the state represented by the field intensity 518. Although the WPT-enabled transmitting device still receives control packets 557.1 through 557.i for the duration of the charge cycle, fewer adjustments are required by utilizing the charge history and interaction information stored in WPT-enabled transmitting device.

CONCLUSION

It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It should be noted that the buses shown throughout the illustrations should not be interpreted strictly as single wired or wireless connections. Any, some, or all of the buses indicated throughout the Figures can be a grouping of multiple connections, a grouping of wireless links, or a combination of wired and wireless links. Furthermore, the various buses should not be interpreted as limited to carrying only one type of signal or limited to a single type of hardware. For example, coupler buses can be implemented as coaxial cables, while other buses can be implemented as part of a printed circuit board wiring. Finally, the buses can carry a variety of signals such as analog, digital, or mixed signals in accordance with the spirit and scope of the invention.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless power transfer (WPT) enabled device, comprising:
   a driver module configured to provide a power signal for wireless power transfer to a second WPT-enabled device according to default transfer parameters, including a magnetic or electric field of a nominal intensity, associated with an initial power transfer phase; and
   a controller module configured to:
      store, in a memory, an operating parameter and a unique identifier from the second WPT-enabled device during the initial power transfer phase;
      adjust the initial power transfer phase to a refined power transfer phase based on the operating parameter; and
      enable the driver module to wirelessly transfer power subsequent to the initial power transfer phase according to updated transfer parameters associated with the refined power transfer phase by correlating the unique identifier with the stored operating parameter of the second WPT-enabled device.

2. The WPT-enabled device of claim 1, wherein the WPT-enabled device is coupled to the second WPT-enabled device via an inductive coupling or a capacitive coupling.

3. The WPT-enabled device of claim 1, wherein the controller module is further configured to refine the initial power transfer phase by adjusting the power signal.

4. The WPT-enabled device of claim 1, wherein the controller module is further configured to refine the initial power transfer phase by adjusting power wirelessly received by the second WPT-enabled device.

5. The WPT-enabled device of claim 1, wherein the operating parameter comprises at least one of:
   a wireless charging standard supported by the second WPT-enabled device;
   a device type associated with the second WPT-enabled device;
   a total amount of power the second WPT-enabled device is capable of wirelessly transmitting;
   a total amount of power the second WPT-enabled device is capable of wirelessly receiving;
   a total amount of power required by the second WPT-enabled device;
   a power level received by the second WPT-enabled device in excess of the total amount of power required by the second WPT-enabled device;
   a power level received by the second WPT-enabled device below the total amount of power required by the second WPT-enabled device;
   a resonant frequency of a WPT-enabled device coupler or a second WPT-enabled device coupler;
   a coupling factor between the WPT-enabled device and the second WPT-enabled device; and
   a first WPT-enabled device or a second WPT-enabled device maximum power handling level.

6. The WPT-enabled device of claim 1, wherein the refined power transfer phase comprises:
   a more efficient power transfer phase as compared to the initial power transfer phase.

7. The WPT-enabled device of claim 1, wherein the WPT-enabled device is a wireless charger, wherein the second WPT-enabled device is from among a plurality of second WPT-enabled devices, and wherein the controller module is further configured to:
   receive a plurality of operating parameters from the plurality of second WPT-enabled devices; and
   refine the initial power transfer phase based on the plurality of operating parameters.

8. The WPT-enabled device of claim 7, wherein the plurality of second WPT-enabled devices are substantially concurrently charged, and wherein the controller module is further configured to:
   store a session identification based on the plurality of operating parameters; and
   wirelessly transfer power according to the refined power transfer phase for power transfers subsequent to the initial power transfer phase, by correlating the session identification to the plurality of second WPT-enabled devices.

9. The WPT-enabled device of claim 1, wherein the controller module is configured to encrypt the operating parameter and the unique identifier.

10. In a wireless power transfer (WPT) enabled device, a method comprising:
    receiving an initial configuration record from a second WPT-enabled device indicative of a functionality of the second WPT-enabled device;
    initiating a first wireless communication session with the second WPT-enabled device based on default transfer parameters, including a magnetic or electric field of a nominal intensity, associated with the initial configuration record;
    receiving an operating parameter from the second WPT-enabled device;
    updating the initial configuration record based on the operating parameter to provide an updated configuration record; and
    initiating a second wireless communication session with the second WPT-enabled device based on updated transfer parameters associated with the updated configuration record.

11. The method of claim 10, wherein the initiating the first wireless communication session comprises:
    performing a non-WPT communication between the WPT-enabled device and the second WPT-enabled device or wirelessly transferring power between the WPT-enabled device and the second WPT-enabled device,
    and wherein the initiating the second wireless communication session comprises:
    performing a non-WPT communication between the WPT-enabled device and the second WPT-enabled device, or wirelessly transferring power between the WPT-enabled device and the second WPT-enabled device.

12. The method of claim 10, wherein the first and the second wireless communication sessions each include a first wireless power transfer and a second wireless power transfer, respectively, between the first WPT-enabled device and the second WPT-enabled device, and wherein the updating comprises:
    updating the initial configuration record such that the second wireless power transfer is more efficient than the first wireless power transfer.

13. The method of claim 10, wherein the receiving the initial configuration record further comprises:
    receiving the initial configuration record from the second WPT-enabled device indicative of at least one of:
       a wireless charging standard supported by the second WPT-enabled device;
       a wireless communication standard supported by the second WPT device;
       a WPT frequency;
       metal content of the second WPT-enabled device;
       WPT capabilities of the second WPT-enabled device;
       WPT configurations of the second WPT-enabled device;
       wireless communication capabilities of the second WPT-enabled device;
       network hosting capabilities of the second WPT-enabled device;
       a type of device associated with the second WPT-enabled device;
       unique identifier information associated with the second WPT-enabled device;
       wireless network configuration information associated with the second WPT-enabled device; and
       security information associated with the second WPT-enabled device.

14. The method of claim 10, further comprising:
    encrypting the initial configuration record and the updated configuration record.

15. In a first wireless power transfer (WPT) enabled device, a method comprising:
    initially communicating with a second WPT-enabled device according to default transfer parameters, including a magnetic or electric field of a nominal intensity, associated with an initial configuration record;
    receiving an operational parameter from the second WPT-enabled device;

updating the initial configuration record based on the operational parameter to provide an interaction history record; and wirelessly communicating with the second WPT-enabled device on subsequent communications based on the interaction history record.

16. The method of claim 15, further comprising:

wirelessly transferring power to the second WPT-enabled device according to an initial power transfer profile, the initial power transfer profile being based on the initial configuration record.

17. The method of claim 16, wherein the wirelessly communicating with the second WPT-enabled device on subsequent communications comprises:

wirelessly transferring power to the second WPT-enabled device according to a refined wireless transfer profile based on the interaction history record, wherein the refined wireless transfer profile is a more efficient wireless transfer profile as compared to the initial power transfer profile.

18. The method of claim 15, wherein the receiving the operational parameter from the second WPT-enabled device comprises:

receiving data indicative of a WPT capability or a non-WPT capability of the second WPT-enabled device as the operational parameter.

19. The method of claim 18, wherein the wirelessly communicating with the second WPT-enabled device on subsequent communications comprises:

communicating with the second WPT-enabled device based on the WPT capability or the non-WPT capability.

20. The method of claim 15, further comprising:

receiving the initial configuration record from the second WPT-enabled device.

21. The method of claim 15, further comprising encrypting the initial configuration record and the interaction history record.

* * * * *